J. H. TOMLINSON.
BUCKET.
No. 90,798.                          Patented June 1, 1869.
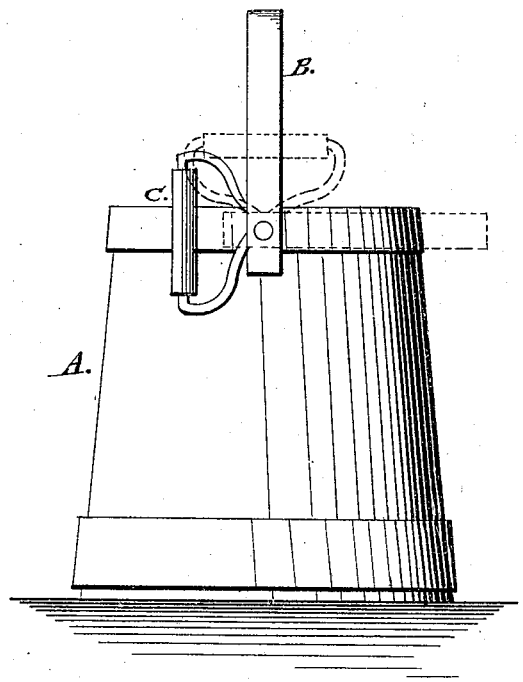

United States Patent Office.

JOHN H. TOMLINSON, OF CHICAGO, ILLINOIS.

Letters Patent No. 90,798, dated June 1, 1869.

IMPROVED BUCKET.

The Schedule referred to in these Letters Patent and making part of the same.

*To all whom it may concern:*

Be it known that I, JOHN H. TOMLINSON, of Chicago, in the county of Cook, and State of Illinois, have invented a new and useful Improvement in Buckets; and I do hereby declare that the following is a full, clear, and exact description thereof, which will enable others skilled in the art to make and use the same, reference being had to the accompanying drawing, forming part of this specification.

This invention relates to a new and useful improvement in buckets and pails, and all bailed vessels of a similar nature, as pots and kettles, whether formed of wood or metal, which have hitherto been handled by bails, and consists in attaching, in combination with the bails of such vessels, handles, as will be hereinafter described.

The accompanying drawing represents a bucket provided with handles, according to my invention, or in combination with the bail.

A is the bucket.

B is the bail, which is attached to the bucket in the ordinary manner, on each side.

To the same pivots which support the bail, or to other pivots on other parts of the rim of the bucket, I attach handles C, on each side, so that the bucket, pail, or kettle may be carried by two persons thereby.

In this example of my invention, the handles are rigidly attached to the bail, so that they turn up when the bail is turned down, and *vice versa.*

The position of the bail when the bucket is so carried is shown in red color, as is the position of the handles.

It will be seen that when the bail is in use, the handles are not in the way, and so with the bail when the handles are in use.

By this simple and inexpensive device, the handling of large bailed vessels of the ordinary size, containing heavy materials, is greatly facilitated.

Having thus described my invention,

I claim as new, and desire to secure by Letters Patent—

In combination with a bailed vessel, the handles C, arranged substantially as and for the purposes herein shown and described.

JOHN H. TOMLINSON.

Witnesses:
G. GRAYSON,
L. S. PORTER.